United States Patent Office 3,661,846
Patented May 9, 1972

3,661,846
ORGANO-INORGANO POLYMERS AND THEIR PREPARATION
Malcolm E. Kenney, 1203 Hereford Road,
Cleveland Heights, Ohio 44118
No Drawing. Continuation-in-part of application Ser. No. 831,745, June 9, 1969, which is a continuation-in-part of abandoned application Ser. No. 662,239, July 31, 1967. This application Sept. 4, 1970, Ser. No. 69,883
Int. Cl. C08 11/04
U.S. Cl. 260—46.5 R                12 Claims

ABSTRACT OF THE DISCLOSURE

Organo-inorgano polymers, useful as thermal insulators and as reinforcing agents for resins, through a method including: contacting the ordered sheet silicate minerals chrysotile and apophyllite with an organosilicon compound and strong acid in an organic liquid between 20° C. and up to and including reflux temperature for at least one hour; and subsequently contacting under more nearly neutral conditions the resulting product thereof with an organosilicon compound neat or in an organic solvent between 20° C. and up to and including reflux temperature for at least one hour. Hydrophobic, ordered, organo-inorgano polymers of a molecular weight of more than ten thousand and consisting essentially of carbon, hydrogen, silicon, and oxygen with at least 65 percent by weight thereof being silicon and oxygen, possessing a sheet silicate framework consisting essentially of silicon and oxygen and alike the sheet silicate framework of its mineral source while substantially free from metal atoms found in its mineral source, and having organosiloxy groups appended in substantial amount to silicon atoms of its sheet silicate framework.

RELATED APPLICATIONS

This application is a continuation-in-part application of my copending application, Ser. No. 831,745, filed June 9, 1969, now abandoned which was a continuation-in-part application of application Ser. No. 662,239, filed July 31, 1967, now abandoned.

DISCLOSURE

This invention concerns hydrophobic, ordered, organo-inorgano polymers consisting essentially of an ordered sheet silicate structure having organosiloxy groups appended to silicon atoms of its silicate structure, and also preparation of these polymers from ordered sheet silicate minerals selected from the group consisting of chrysotile and apophyllite. More particularly, the invention relates to novel ordered organo-inorgano polymers possessing ordering and an essential silicate framework to which is attached through bonds to the silicon atoms of the framework a substantial number of pendant organo-silicon groups. The invention also includes preparation of these novel ordered organo-inorgano polymers whereby metal atoms are extracted from the framework of an ordered silicate mineral and appendant organo-siloxy groups are attached to silicon atoms.

It is known that polymers having particular properties can be prepared by appropriately modifying pre-formed polymers, as by grafting or replacing specific atoms or groups in the polymer with desired atoms or groups. Such methods, however, have not produced organo-inorgano polymers having ordered structural frameworks because suitable chemical methods for introducing organic groups onto the known ordered two-dimensional polymer frameworks have not been available. So far as is known, and of the limited published reports available concerning treating of silicate minerals to attach pendant organic groups thereto, none teach prepared products of other than relatively low molecular weights, such as lower cyclic compounds, e.g., a cyclic tetramer, which clearly are not true polymers. Likewise, none of such reported preparations of those products of relatively low molecular weight appear to provide the novel polymers of the invention.

For a polymer to be inherently fibrous, it must be composed of molecules or tight molecular aggregrations which are much longer in one dimension than in the other two, i.e., it must be composed of units which are in the form of slender ribbons, laths, rods, tubes, or other similar shapes. A further requirement is that these units must exert, at most, only relatively weak attractive forces on each other and, hence, be easily separable. It is also desirable that they be fairly rigid so that they cannot become easily knotted.

In view of these requirements, it is apparent that the tubular units are particularly well suited for the formation of fibrous polymers. Such units have inherently high structural integrity and stiffness and in addition can, at most, have only little contact with their neighbors, and hence can exert only weak attractive forces on them. Rods are also obviously quite suitable. Laths and ribbons are less suitable because their flat surfaces naturally lead to large inter-unit contacts and hence to nonfibrous massive superunits.

An inherently fibrous inorganic polymer based on tubular units is the form of serpentine known as chrysotile. This mineral is of a sheet silicate structure with the idealized formula $Mg_3(OH)_4Si_2O_5$. It is derived from the $Si_2O=$ sheet. In chrysotile this layer occurs in long narrow ribbons or sheets composed of a linked network of $SiO_4$ tetrahedra. These are condensed with $Mg(OH)_2$, or brucite layers, to form long narrow neutral ribbons or sheets. All of the $SiO_4$ tetrahedra in the silicate sheet point one way, and joined thereto is the brucite-layer, in which, on one side only, two out of every three hydroxyls are replaced by apical oxygens of $SiO_4$ tetrahedra. Because comparable segments of the brucite layer and the silicate layer do not quite match, the brucite segment being larger, the ribbons or sheets are strained. Relief from this strain is gained from a curl of the ribbons or sheets along their long axes with the brucite layer on the outside. Ultimately in ordinary chrysotile, tubes with a dozen or so layers in their walls are formed. Often these tubes are several hundred angstroms in outside diameter and thousands of angstroms long.

On the basis of evidence in the literature, it is not clear whether in general the tubes are composed of partial concentric cylinders, rolls, or a combination of these possibilities. Also uncertain is the nature of the material inside and between the tubes. Further complicating the situation is the curious tube within a tube arrangement which is sometimes observed. However, in spite of these uncertainties, the overall multiwalled tube construction of chrysotile is clear.

Apophyllite, although often found together with zeolites, is more akin to ordered sheet silicate minerals. It has the idealized formula of $KFCa_4Si_8O_{20}8H_2O$. A basic part of its structure is a silicate sheet of composition $Si_2O_5$ having its $SiO_4$ tetrahedra components arranged in four-fold and eight-fold rings and with alternate rings of four tetrahedra pointing in opposite directions. Linking these puckered sheets and lying on horizontal mirror planes between them are Ca, K, and F ions; and oxygens of water molecules lie in the plane of tetrahedral apices. Each calcium is seven-fold coordinated by four oxygens (each of which is linked to a silicon atom), by one fluorine ion in the same plane, and by two oxygens of water molecules. Each fluorine atom is surrounded by four calcium ions. The potassium ions are eight-fold coordinated by the water molecules, four in a plane above and four below.

This invention provides novel hydrophobic ordered organo-inorganic polymers derived from ordered sheet silicate minerals, in particular derived from the ordered sheet minerals of chrysotile and apophyllite, whose elemental chemical composition contains silicon, oxygen, and metal ions. The organo-inorgano polymer possesses an essential ordered silicate structural framework alike and corresponding to the ordered structural framework of the ordered sheet silicate mineral from which it is derived with this essential ordered silicate structural framework substantially free from those metal ions found in the mineral from which it is derived, possessing additional oxygen-bridge cross-linkages between silicon atoms thereof, and possessing organosiloxy groups in a substantial amount each appended to a silicon atom of this essential ordered silicate structural framework. The novel organo-inorgano polymers, upon analysis thereof, consist essentially of carbon, hydrogen, silicon, and oxygen with at least 65 percent by weight thereof being silicon and oxygen. The organosiloxy groups appended to the sheet's silicon atoms are alkylsiloxy radicals whose alkyl moieties are predominantly methyl radicals. Thus, the polymer's pendant organosiloxy groups contain at least two methyl radical moieties and may be any of the polydimethylsiloxy, trimethylsiloxy, ethyldimethylsiloxy, propyldimethylsiloxy, butyldimethylsiloxy, vinyldimethylsiloxy, and phenyldimethylsiloxy radicals. Preferred organo-inorgano polymers have trimethylsiloxy radicals accounting for more than 50 percent of the total pendant organosiloxy groups thereof and particularly preferred polymers have trimethylsiloxy radicals making up substantially 100 percent of their total pendant organosiloxy groups. The novel hydrophobic ordered organo-inorgano polymers derived from the ordered sheet silicate minerals chrysotile and apophyllite have molecular weights of more than ten thousand.

The novel hydrophobic ordered organo-inorgano polymers of the invention are provided by a process which, in general, involves two principal preparative aspects. Briefly, a novel polymer is prepared by extracting its sheet silicate framework or structure from an ordered sheet silicate mineral and then simultaneously and/or subsequently introducing and appending organosiloxy groups onto this sheet silicate framework. In the first preparation stage, the sheet silicate framework in its essential features for the polymer is procured from the starting sheet silicate mineral, and concurrently, and generally also subsequently, organosiloxy groups appended to silicon atoms of this framework. In this first preparation stage a starting sheet silicate mineral in liberated form in an organic liquid reaction medium is treated with strong acid and organosilicon compound so as to deplete the mineral substantially (i.e., more than 90 percent by weight) of its metal ion content (i.e., depleted of magnesium ions in the case of employing the mineral chrysotile; and depleted of calcium and magnesium ions, and also fluorine in the case of employing the mineral apophyllite) and to form an essential sheet silicate framework for the polymer of the invention. In the first preparation stage, organosiloxy groups also concurrently are introduced and appended to silicon atoms of the concurrently produced essential sheet silicate framework of the polymer of the invention. In a second preparation stage, additional organosiloxy groups are introduced and appended to silicon atoms of the polymer's essential sheet silicate framework produced in the first preparation stage until as a result of both stages a substantial amount of organosiloxy groups are appended. By a substantial amount of appended organosiloxy groups there is intended that the employed mineral upon substantially complete depletion of its metal ion content will have organosiloxy groups appended to more than 15 percent of the mineral's sheet silicon atoms. This second preparation stage is carried forth with the neat organo-silicon reactant or in an organic liquid reaction medium by contacting the organosilicon product resulting from the first preparation stage with organosilicon reactant so as to introduce and append additional organosiloxy groups to the polymer.

An important aspect of the invention and the novel polymers thereof is that the process of the invention extracts the polymer's essential silicate framework from the employed ordered sheet silicate mineral and, although modifying the mineral's silicate framework by removal therefrom of metal atoms, continues to provide substantially the mineral's essential silicate framework as the polymer's essential silicate framework so as to provide highly useful structural forms of the novel polymer, such as structural forms of a fiber formed from a rolled sheet. In this respect structural forms of the polymer derived from chrysotile resemble corresponding structural forms of the mineral chrysotile except the brucite layer in chrysotile has been replaced in essence by a multiplicity of appended organosiloxy groups.

In general the process by which the organo-inorgano polymers of the invention are obtained involves two procedural aspects. The first is predominantly a synthesis or procurement of a compound containing the framework of the polymer in its essential features with a substantial amount of appended organosiloxy groups. The second is a conversion of this product to the desired final polymer by the placement of a significant number of additional appropriate pendant groups onto the framework and alteration of the framework as necessary. Thus, organosiloxy groups-containing polymers of the invention are formed by extracting the silicate frameworks from framework silicates and simultaneously, and also generally subsequently, introducing pendant organosiloxy groups thereon.

Preferably this extraction and substitution is accomplished in two distinct steps; the first step of which comprises treating the silicate mineral in a strongly acidic liquid reaction medium with an organosilicon compound, possessing a functional group reactive with a silanol OH group, at a temperature which can vary from about 20° C. to reflux under the conditions of reaction. In this first step, the essence of the silicate framework of parent silicate mineral is extracted in a like structural framework form except substantially devoid of those metal atoms found in the parent silicate mineral and except modified so as to contain some pendant organosiloxy groups. In this first step a significant number organosiloxy groups are introduced and appended to silicon atoms of the resulting silicate structural framework. The second step comprises treating the product from the first step with an organosilicon reagent to add additional pendant organosiloxy groups to the sheet under temperature conditions like those in the first step.

The first step is carried out in the presence of an organic liquid reaction medium and its nature is critical. Usefully employable reaction media are liquid aliphatic alcohols and ketones, e.g., ethanol, propanol, butanol, ethylene glycol, etc., acetone, methyl ethyl ketone, diethyl ketone, ethyl propyl ketone, etc., with the lower aliphatic alcohols and ketones preferred.

The second step is carried out with the organosilicon reactant neat or in the presence of an organic liquid reaction medium, but under more nearly neutral conditions in contrast to the first step wherein a strong acid is present in the reaction medium. Useful organic liquid reaction media for the second step are solvents for the employed organosilicon reactant and in particular are liquid paraffinic and aromatic hydrocarbons, such as cyclohexane, benzene, toluene, xylene, and the like, or basic liquid organic solvents, or mixtures of the liquid paraffinic and aromatic hydrocarbons and/or basic liquid organic solvents. A basic liquid organic solvent, when employed in the second step, serves to assure nonacidic conditions by depleting the reaction medium of any strong acid which may be present, possibly arising from employing an incompletely washed product of the first step or forming in situ as a byproduct from reaction of certain organosiloxy compounds with reactive groups of the sheet silicate, e.g., silanol and siloxane. Illustrative useful basic liquid organic solvents are: pyridine, which is preferred, as well as the methyl pyridines, especially picoline, and quinoline, and the like aromatic tertiary amines. A basic liquid organic solvent is employed in the reaction medium in the second step, or care taken to wash the first step's product free from strong acid and also to select and employ only those organosilicon compounds in the second step which do not form a byproduct strong acid upon reaction with reactive groups of the silicate sheet.

The amount of reaction medium to employ in both steps is not critical and it can be varied over wide limits. For practical reasons, the amount employed in the first step is conveniently between 1 and 200 times the weight of the silicate mineral being reacted, and in the second step is between 1 and 200 times the weight of the employed amount of the first step's product.

In the first step, a strong acid should be present in the charge and this is essential to the process. Illustrative, suitable, and useful strong acids are hydrochloric, hydrobromic, hydriodic, and the like, strong acids. These strong acids in dilute solution are virtually completely ionized. They also are characterized by an ionization constant larger than $1 \times 10^{-4}$. In contrast thereto, weak acids, such as acetic and benzoic acids, are only slightly ionized, i.e., about one percent ionized, and very weak acids are ionized much less than one percent. Weak and very weak acids have ionization constants less than $1 \times 10^{-4}$ and are not useful in the invention. The amount of strong acid employed is critical since it affects the degree of substitution obtained. There is required to be present an amount of the strong acid which is at least the stoichiometric amount to react with the metal ion content of the silicate mineral. Generally the strong acid is provided in an amount greater than stoichiometric and, when employing hydrochloric acid, in amount at least 0.3 times and between 0.3 to 10 times or more the weight of the silicate mineral being treated. Correspondingly with HBr the minimum amount to be present is about 0.6 times the weight of the mineral and with HI about 0.9 times the weight of the mineral, although generally there are provided at least several times these amounts. It should be noted that the presence of the required amount of strong acid can be assured by addition to and inclusion of the strong acid per se in the reaction medium or, alternatively the strong acid can be created in situ as a byproduct of the reaction of the organosilicon compound. Most generally the strong acid employed is added and utilized in the process as an aqueous solution of the concentrated acid. When an aqueous concentrated solution of the strong acid is not employed in the charge, a small amount of water, generally between 100 to 200 percent of the required amount of acid, should be added and included in the charge for practicing the first preparation step in order to assist in achieving a necessary acidity in the reaction mixture.

The organosilicon compound is employed in each step in an amount which is at least the amount required to provide one organosilicon group for each silicon atom in the sheet silicate mineral. Generally and preferably, however, the organosilicon compound is employed in a considerable excess over this one to one ratio, and most usually up to 100 or more times is employed to facilitate preparation of the organo-inorgano polymer. In the case of chrysotile being employed as the ordered sheet silicate mineral, this one to one ratio calculates to be two moles of chlorotrimethylsilane for each 277 grams of employed chrysotile, and the like-calculated amounts of the various useful other organosilicon compounds when employing them. In the case of apophyllite being employed as the ordered sheet silicate mineral, this one to one ratio calculates to be eight moles of chlorotrimethylsilane for each 907 grams of employed apophyllite, and the like-calculated amounts of the various useful other organosilicon compounds when employing them.

The reaction is carried forth in each step at temperatures which can be anywhere between from near ambient temperature (i.e., about 20° C. room temperature) to the charge's reflux temperature. Although most conveniently the reaction is carried forth at atmospheric pressure, if desired super-atmospheric pressures can be used, and in some instances this is advantageous to shorten reaction time. In general the reaction proceeds more rapidly at high temperatures with employment of higher temperatures close to and including reflux temperature being preferred.

The length of time for carrying forth the reaction is dependent on the temperature or temperatures employed in the reaction. The time duration for carrying forth the reaction is also somewhat dependent on the particularly employed and the ratios of employed strong acid, organosilicon compound, and organic liquid reaction medium to each other and to the amount of employed mineral in carrying forth the first step and on the particularly employed and the ratios of employed organosilicon compound and organic liquid reaction medium to the amount of employed first-step product in carrying forth the second step. Depending upon the temperature employed as well as the other materials, also their amounts and ratios to each other, included in the charges of each step, suitable reaction times for each step can vary from as low as about one hour and be up to several months and longer, with the shorter times most useful when employed at and near reflux temperature and with the longer times used mainly at lower temperature conditions. The first step is carried forth for at least that time which permits substantial depletion from the employed mineral of its metal ion content (i.e., magnesium in the case of employing chrysotile, and calcium, and magnesium metal ions as well as fluorine in the case of employing apophyllite). This time for substantial depletion readily can be found by removal of small portions of the mineral being reacted at various time periods during the reaction, and, after a thorough washing thereof, by conventional analysis of such portions readily determining their specific metal ion content or freedom therefrom. Upon employing reflux temperature and severalfold and higher ratios of strong acid, the time for substantial depletion of metal ion content is less than several days and in some instances is between one to twenty-four hours. Desirably and preferably the first stage is carried forth for between one to seven days to assure substantial depletion of the mineral's metal ion content from the first-step product. The second stage or appending of additional organosiloxy groups generally is carried forth for at least one hour and usually between a few hours to one day to bring the total appended organosiloxy groups to a substantial amount.

As already noted, in the first preparation stage in addition to depletion of the mineral's metal ion content, there also are provided organosiloxy groups which substitute at least in part therefor and append to the substitutable silicon atoms. In order to provide a substantial amount of appended organosiloxy groups it is preferred to recover the first step's product, wash it free from strong acid, and then carry forth the second step to append additional organosiloxy groups to substitutable silicon atoms in order to provide the organo-inorgano polymer with a substantial number of appended organosiloxy groups. However, the first step's product, which contains a significant amount of appended organosiloxy groups, i.e., more than 10 percent of the sheet silicon atoms have an appended organosiloxy group, is of utility in some applications and especially in applications where the maximum number of pendant organosiloxy groups is not of import and for such end-usage applications it is not necessary to carry forth a distinct second preparation step to obtain a useful product having a substantial amount of appended organosiloxy groups.

Organosilicon compounds comprise one or more tetravalent silicon atoms having at least one valence thereof satisfied by an organic (carbon-containing) moiety through a silicon-to-carbon linkage. Of utility for practicing the invention are those organosilicon compounds which contain methyl radicals and which also may contain ethyl, propyl, butyl, vinyl, and/or phenyl radicals as their organic moieties with more than 50 percent of the total organic moieties in those organosilicon compounds useful herein being methyl radicals and with less than about 30 percent being phenyl radicals. Each of the useful organosilicon compounds also includes in its structure at least one occurrence of a chlorine, singly bound oxygen, or singly bound nitrogen attached to a silicon atom thereof in order to provide the organosilicon compound with a functional group which can directly or indirectly react with functional groups on the silicate sheet. Useful organosilicon compounds for practicing the process of the invention are of the formulae (A) 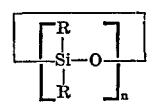

(B) 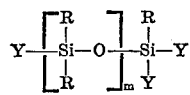

(C) 

(D) 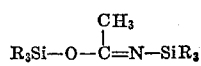

(E) 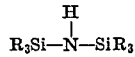

and

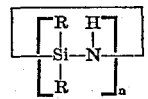

in which
$n$ is an integer of 3 to 6 inclusive,
$m$ is an integer of 1 to 6 inclusive,
Y is the chlorine atom or R, and
R is a methyl, ethyl, propyl, butyl, vinyl, or phenyl radical, with more than 50 percent of the total R groups present being methyl radicals and with no more than about 30 percent being phenyl radicals, with it preferred that there be no more than one R group larger than methyl on each silicon atom of the organosilicon compound.

In the first preparation step the useful organosilicon compounds are of the aforesaid (A), (B), and (C) formulae and in the second preparation step the useful organosilicon compounds are of the aforesaid (A) through (F) formulae, inclusive. In employing the useful organosilicon compounds of the aforesaid (A), (B), and (C) formulae in the first preparation step generally there are avoided compounds thereof having any R groups which are the phenyl radical in that strong acid will cleave the phenyl group from the organosilicon compound. Particularly preferred are those organosilicon compounds of the aforesaid formulae in which more than 80 percent of all their R groups are methyl radicals, and most particularly preferred are those in which all of their R groups are methyl radicals. It can be noted from the aforesaid formulae of useful organo-silicon compounds for these compounds to contain methyl radicals as more than 50 percent of their total organic moieties thereof that in the (A) formula at least $n+1$ of the total of $2n$ R groups will be methyl radicals, in the (B) formula $m+3$ groups will be methyl radicals when both Y groups are R in that the total of the R groups therein be $2m+4$, in the (B) formula $m+2$ R groups will be methyl radicals when one or both Y groups are —Cl in that the total R groups therein be $2m+3$ and $2m+2$, respectively, in the (C) formula at least two R groups are methyl radicals in that the total R groups therein will be two when Y is —Cl or, in the case of Y being R will be three, in the (D) formula at least four of the total of six R groups will be methyl radicals, in the (E) formula at least four of the total of six R groups will be methyl radicals, and in the (F) formula at least $n+1$ of the total $2n$ R groups will be methyl radicals.

Illustrative of, and included in, but not inclusive of all of the organosilicon compounds useful in the contacting steps of the process of the invention are the following:

Under Formula A hexamethylcyclotrisiloxane, and also corresponding cyclotrisiloxanes containing at least four methyl radicals with the remaining organic moieties thereof being the same or different and being ethyl, propyl, butyl, vinyl, or phenyl radicals, octamethylcyclotetrasiloxane, and also corresponding cyclotetrasiloxanes containing at least five methyl radicals with the remaining organic moieties thereof being the same or different and being ethyl, propyl, butyl, vinyl, or phenyl radicals, decamethylcyclopentasiloxane, and also corresponding cyclopentasiloxanes containing at least six methyl radicals with the remaining organic moieties thereof being the same or different and being ethyl, propyl, butyl, vinyl, or phenyl radicals, dodecamethylcyclohexasiloxane, and also corresponding cyclohexasiloxanes containing at least seven methyl groups with the remaining organic moieties thereof being the same or different and being ethyl, propyl, butyl, vinyl, or phenyl radicals;

Under Formula B hexamethyldisiloxane, chloropentamethyldisiloxane, and dichlorotetramethyldisiloxane; octamethyltrisiloxane, and corresponding trisiloxanes containing at least five methyl radicals with the remaining organic moieties thereof being the same or different and being ethyl, propyl, butyl, vinyl, or phenyl radicals and also their corresponding chloro-, and dichlorosiloxane derivatives, decamethyltetrasiloxane, and corresponding tetrasiloxanes containing at least six methyl radicals with the remaining organic moieties thereof being the same or different and being ethyl, propyl, butyl, vinyl, or phenyl radicals and also their corresponding chloro-, and dichlorotetrasiloxane derivatives, dodecamethylpentasiloxane and corresponding pentasiloxanes containing at least seven methyl radicals with the remaining organic moieties thereof being the same or different and being ethyl, propyl, butyl, vinyl, or phenyl radicals and also their corresponding chloro-, and dichloropentasiloxane derivatives, tetradecamethylhexasiloxane and corresponding hexasiloxanes containing at least eight methyl radicals with the remaining organic moieties thereof being the same or different and being ethyl, propyl, butyl, vinyl, or phenyl radicals and also their corresponding chloro-, and dichlorohexasiloxanes derivatives;

Under Formula C trimethylchlorosilane, ethyldimethylchlorosilane, propyldimethylchlorosilane, phenyldimethylchlorosilane, dimethyldichlorosilane;

Under Formula D N,O-bis (trimethylsilyl) acetamide, and also corresponding acetamides having a tri-(R-radical₃silyl) group affixed to each of the N and O atoms thereof with a total of at least four R-radicals being methyl groups and with the remaining R-radicals being the same or different and being methyl, ethyl, propyl, butyl, vinyl, or phenyl radicals;

Under Formula E hexamethyldisilazane, and also corresponding silazanes containing at least four methyl radicals with the remaining organic moieties thereof being the same or different and being ethyl, propyl, butyl, vinyl, or phenyl radicals; and under Formula F hexamethylcyclotrisilazane, and also corresponding cyclotrisilazanes containing at least four methyl radicals with the remaining organic moieties thereof being the same or different and being ethyl, propyl, butyl, vinyl, or phenyl radicals, octamethylcyclotetrasilazane, and also corresponding cyclotetrasilazanes containing at least five methyl radicals with the remaining organic moieties thereof being the same or different and being ethyl, propyl, butyl, vinyl, or phenyl radicals, decamethylcyclopentasilazane, and also corresponding cyclopentasilizanes containing at least six methyl radicals with the remaining organic moieties thereof being the same or different and being ethyl, propyl, butyl, vinyl, or phenyl radicals, dodecamethylcyclohexasilizane, and also corresponding cyclohexasilizanes containing at least seven methyl groups with the remaining organic moieties thereof being the same or different and being ethyl, propyl, butyl, vinyl, or phenyl radicals.

The following examples are for purposes of illustrating preferred specific embodiments of the invention and are not to be construed as limiting the invention to less than its true scope.

Example 1

The silicate mineral known as chrysotile is used for this example and in its as-received form consisted of grayish blocks of cross-grain silky fiber. Small pieces of the mineral are broken from the block material and twisted by hand until well opened. A 5.03 g. sample of this opened chrysotile, whose idealized molecular formula corresponds to $Mg_3(OH)_4Si_2O_5$, is placed in a flask together with 250 ml. of isopropanol, 50 ml. of aqueous conc. (i.e., 36 percent) hydrochloric acid, and 100 ml. of chlorotrimethylsilane and the mixture refluxed for one day. An additional 50 ml. portion of chlorotrimethylsilane then is added and refluxing continued for seven days. Thereafter, the reaction mixture is allowed to cool, the product separate by filtration, washed successively with water, aqueous acetone, and then acetone, and heated at 110° C. for 2.5 hours. The dried, white fibrous product obtained weights 3 g.

At the start of the reaction the chrysotile is hydrophilic and rests at the bottom of the reaction mixture, but within about five hours it becomes hydrophobic and rises to the top of the mixture. After about one day it becomes visibly swollen and gelatinous, and by the end of the reaction it is highly swollen. During the acetone washes, the final product swells to a voluminous, transparent, colorless, fluid jelly. This jelly collapses to a compact white mass when washed with water or when dried.

The washed product, when completely dry, is very much like a piece of filter paper—white and obviously fibrous. Microscopic examination with polarized light shows it to consist of fiber bundles, which extinguish approximately parallel to the plane of polarized light. When wetted with organic solvents, the fiber bundles become nearly isotropic.

The sodium chloride infrared spectrum (Beckman IR8 Infrared Spectrophotometer) of a thin mat of the product on a salt plate shows absorptions characteristic of trimethylsiloxy and silanol groups.

A 1.49 g. portion of the product is refluxed with stirring with a mixture of 125 ml. of chlorotrimethylsilane and 15 ml. of pyridine for two days; thereafter, the product is separated, worked successively with water, aqueous acetone, acetone, and carbon tetrachloride and dried for 2.5 hours at 110° C. The resultant product is no longer fibrous in appearance but swells markedly in organic solvents. Microscopic examination shows that the product is anisotropic, that its anisotropicity decreases on swelling, and that there are very few well-defined fiber bundles.

EXAMPLE 2

In a repetition of Example 1, except that the reaction mixture is not stirred, the final resulting product is visibly fibrous.

The products of Examples 1 and 2 have the same infrared spectral characteristics, showing the following absorptions: 3472 w., b; 2967 m.; 2907 sh.; 1255 m.; 1176 sh.; 1075 s., b; 969 w., sh.; 864 sh.; 845 s.; and 756 m.

The X-ray diffraction pattern (G.E. XRD-6 Diffractometer, Ni filtered CuK radiation) of mats of the fibers (Product of Example 2) on glass plates show strong peaks corresponding to $d$ spacings of about twice the interplanar spacing in chrysotile, i.e., 15.0 A. for the stirred product and 15.1 A. for the unstirred product.

The diffraction pattern of a mat of the unstirred product (Product of Example 1) which has been swelled with 2-butanone shows no 15 A. peak but does show a weaker and broad peak centered at about 13.6 A. The tracing of this product, upon evaporation of the solvent, is identical to its initial tracing.

A p-nitrobenzeneazoresorcinal test for magnesium (F. Feigl, "Spot Tests," Elsevier Publishing Co. (1954), page 407) on the stirred sample is negative. Quantitative elemental analysis of the stirred and unstirred products of Examples 1 and 2 give respectively 16.2% S., 4.5% H, 42.0% Si, and 37.3% O (by difference), and 17.3% C, 4.5% H, 40.2% Si, and 38.0% (by difference). These data correspond approximately to those calculated on the assumption that the silicate sheet is extracted from the chrysotile intact and that trimethylsiloxy groups are subsituted on about one-third of the sheet silicon atoms and the rest of the sheet silicon atoms are cross-linked to each other by additional oxygen bridges.

Electron micrographs (Hitachi HU-11A) are obtained on the stirred material which had been ground, swelled with chloroform, and then deposited on a carbon coated copper grid. A micrograph also is obtained of a sample of the unstirred material which had been partially swelled in propylene oxide, embedded in Araldite resin, and cross-sectional (Servall Porter-Blum M-1 microtome equipped with a diamond knife, approximately 700 A. sections). The electron micrographs show that the polymer is fibrous and that the fibers consist of rolled-up sheets. They also show that the fibers are very similar to those in the parent chrysotile in length to diameter ratio and in size.

EXAMPLE 3

Examples 1 and 2 are repeated employing substantially the same procedures, conditions, and materials thereof, except that in place of the 50 ml. of 36% conc. hydrochloric acid there is used another strong acid. In one of the repetitions there is used 100 ml. of 30% aqueous conc. hydrobromic acid; and in other repetitions there are used 150 ml. of 30% aqueous conc. hydriodic acid, and 75 ml. of a 1:1 mixture of 36% aqueous conc. hydrochloric and 30% aqueous conc. hydrobromic acids, respectively.

In each repetition the resulting product closely approximates products obtained in Examples 1 and 2 in that (a) the resulting product is hydrophobic and swells in organic solvents, (b) has an apparent molecular weight of more than ten thousand, (c) upon elemental chemical analysis thereof is substantially free from magnesium and consists essentially of carbon, hydrogen silicon, and oxygen with at least 65 percent by weight thereof being silicon and oxygen (d) exhibits infrared spectral absorption characteristics and X-ray diffraction pattern closely approximating those of the Examples 1 and 2 products, and (e) in substantially all respects appear to be identical to or to be the substantial equivalent of the Examples 1 and 2 products.

EXAMPLE 4

Chrysotile (1 g.) is reacted at room temperature with mixture containing concentrated hydrochloric acid (50 ml.), 2-propanol (50 ml.) and hexamethyldisiloxane (20 ml.) for a total of 116 days. The mixture is worked up and restarted with new reagents after 39, 52, and 69 days. The 116-day product is refluxed in trimethylchlorosilane (25 ml.) and pyridine (3 ml.) for 48 hours. The infrared spectrum of this product is similar to that of Examples 1 and 2; its X-ray diffraction gives a spacing of 15.3 A.; and it analyzes 19.0% C, 4.8% H, and 42.3% Si.

EXAMPLE 5

Chrysotile (1 g.) is refluxed with a solution of oxalic acid hydrate (6 g.) and trimethylchlorosilane (25 ml.) in acetone (150 ml.) for 4 days. The product is washed and then refluxed in a mixture of trimethylchlorosilane (25 ml.) and pyridine (3 ml.) for days. The resultant product is similar to those of Examples 1 and 2 except that it contained a small amount of chrysotile. It has an X-ray reflection at 15.5 A. and analyzes 17.2% C, 4.8% H, and 40.3% Si.

EXAMPLE 6

Chrysotile (15.0 g.) is allowed to stand with oxalic acid hydrate (3 g.), acetone (750 ml.), and trimethylchlorosilane (125 ml.). The product is recovered, washed, and placed in a fresh reaction mixture after 31 and 95 days. After 228 days a product similar to the products of Examples 1 and 2 is obtained. It has an X-ray reflection at 15.4 A.

EXAMPLE 7

A reaction of chrysotile (1 g.) with a solution of oxalic acid hydrate (6 g.) and dimethyldichlorosilane (20 ml.) in acetone (150 ml.) is refluxed for 3 days. The product is then subjected to the same reagents for an additional 10 days, worked up, and for a further 17 days. The final product is refluxed with dimethyldichlorosilane (25 ml.) and pyridine (3 ml.) for two days. The product has an interlayer spacing of 15.8 A. and analyzes 15.5% C, 4.3% H, and 39.3% Si.

EXAMPLE 8

Chrysotile (1 g.) is refluxed with isopropanol (50 ml.), hydrochloric acid (10 ml.) and ethyldimethylchlorosilane (32.6 ml.) for 8 days. The product is mixed with 5 ml. of ethyldimethylchlorosilane, 0.6 ml. pyridine and 45 ml. of benzene and refluxed for 2 days. The product swells in acetone, has an interlayer spacing of 14.7 A. and analyzes 16.8% C, 4.31% H, and 41.4% Si.

EXAMPLE 9

Chrysotile (0.5 g.) is allowed to stand with isopropanol (25 ml.), concentrated hydrochloric acid (20 ml.) and butyldimethylchlorosilane (15 ml.) for 128 days. The product is refluxed for 2 days with butyldimethylchlorosilane (2 ml.), pyridine (0.2 ml.) and benzene (48 ml.). The infrared spectrum of the final product shows strong butyl and methyl absorption. It has an interlayer spacing of 15.8 A. and analyzes 19.4% C, 4.5% H, and 38.9% Si.

EXAMPLE 10

Chrysotile (0.25 g.) is refluxed with oxalic acid hydrate (1.5 g.) acetone (38 ml.) and butyldimethylchlorosilane (10 ml.) for 4 days. The product is refluxed in a fresh mixture for 4 additional days. The resultant product is refluxed for 3 days with butyldimethylchlorosilane (8 ml.) and pyridine (1 ml.) for 3 days. The product has an interlayer spacing of 15.9 A. and analyzes 19.8% C, 4.6% H, and 37.2% Si.

EXAMPLE 11

Chrysotile (0.25 g.) is mixed with oxalic acid hydrate (1.5 g.) acetone (38 ml.) and butyldimethylchlorosilane (10 ml.) and allowed to stand for 37 days at 32–33°. The infrared spectrum of the product shows mineral OH, and butyl and methyl absorptions. Its X-ray diffraction tracing shows a strong reflection corresponding to a d-spacing of 14.7 A. weaker reflections characteristic of the mineral.

EXAMPLE 12

A 0.5 g. sample of chrysotile is placed in a flask with 38 ml. of technical grade acetone, 13 ml. of chloroethyldimethylsilane, 1.5 g. of oxalic acid hydrate, and refluxed for six days. The white product is washed with water acetone. This material is then placed in a fresh duplicate reaction mixture and refluxing continued for twenty additional days. The product swells in organic solvents and shows infrared absorptions characteristic of hydroxyl and ethyldimethylsiloxy groups.

This product then is refluxed for three days with 10 ml. of chloroethylidemthylsilane and 3 ml. of pyridine.

The resulting product is similar to the product of the first step, except that its infrared spectrum indicated that it contains slightly fewer hydroxyl groups. An X-ray diffraction tracing of it shows a strong reflection corresponding to a d-spacing of 15.0 A. (and a very weak reflection due to unreacted mineral). Elemental analysis gives 17.7% C, 4.3% H, and 39.8% Si. These data correspond approximately to those calculated on the assumption that ethyldimethylsiloxy groups are attached to about one-third of the sheet silicon atoms and the rest of the sheet silicon atoms are cross-linked to each other by additional oxygen bridges.

EXAMPLE 13

A 5.00 g. sample of the silicate mineral apophyllite, whose idealized formula corresponds to $$Ca_4KFSi_8O_{20} \cdot 8H_2O$$

is broken into pieces and placed in a flask together with 250 ml. of dried acetone, 5.00 ml. of water, 125 ml. of chlorotrimethylsilane, and 10.0 g. of malonic acid and allowed to stand at ambient temperature for 152 hours. The resulting white product is washed with acetone and dried at 100° C. This product is found to be very hydrophobic. Its infrared spectrum shows absorptions characteristic of trimethylsiloxy and silanol groups.

A 0.200 g. portion of this product is refluxed with a mixture of -0.0 ml. of pyridine and 10.0 ml. of N,O-bis (trimethylsilyl) acetamide for 3.5 days. The white resultant product is washed with acetone and dried for 24 hours.

This resultant product is hydrophobic. Its infrared spectrum is similar to the product of the first step except that the OH absorption is slightly smaller. Its diffraction pattern shows a strong reflection corresponding to a d-spacing of between 15 and 16 A. Analysis shows the product to contain 22.0% C, 5.6% H, and 40.0% Si. This analysis corresponds to that calculated for a product in which about three-fourths of the sheet silicon atoms carry trimethylsiloxy groups and the remainder are cross-linked to each other.

EXAMPLE 14

Apophyllite (0.5 g.) is reacted at room temperature in acetone (25 ml.) water (0.20 ml.) with trimethylbromosilane (10 ml.) for 8 days. The product is reacted with a fresh mixture for an additional 8 days. The product is similar to that of Example 13.

EXAMPLE 15

Apophyllite (1 g.) is refluxed with malonic acid (6 g.), dimethyldichlorosilane (25 ml.), and technical (wet) acetone (150 ml.) for 5 days. The product was allowed to stand with dimethyldichlorosilane (25 ml.) for 2 days and was then refluxed with dimethyldichlorosilane (25 ml.) and pyridine (3 ml.) for 3 days. The product has an interlayer spacing of 15.8 A. and analyzes 13.4% C, 3.1% H, and 37.6% Si.

EXAMPLE 16

Apophyllite (1 g.) is allowed to stand with malonic acid (4 g.), technical (wet) acetone (100 ml.) and dimethyldichlorosilane (25 ml.) for 9 days. The product is treated with dimethyldichlorosilane (25 ml.) and pyridine (3 ml.) for 3 days. The product has an interlayer spacing of 15.2 A. and analyzes 12.2% C, 3.4% H, and 42.0% Si.

EXAMPLE 17

Upon Example 13 being repeated except for omission of the malonic acid thereof and an increase in reaction time, there is obtained a final product apparently identical to the final product produced in Example 13.

EXAMPLE 18

Upon Example 13 being repeated except in place of the chlorotrimethylsilane and N,O-bis (trimethylsilyl) acetamide thereof, there is employed any of chloroethyl-dimethylsilane, chloropropyldimethylsilane, and dimethyl-dichlorosilane for the chlorotrimethylsilane and N,O-bis (ethyldimethylsilyl) acetamide for the N,O-bis (trimethylsilyl) acetamide, there are obtained resulting products substantially the equivalent of the resulting product of Example 13 except that the resulting products have appended to their product's silicon atoms those particular organosilicon groups derived from the specifically employed organosilicon compound. Thus, appended to silicon atoms of this example's resulting products are trimethylsiloxy groups when there is employed chlorotrimethylsilane and the other organosilicon compounds containing trimethylsilyl radicals; likewise, the product's silicon atoms have appended thereto ethyldimethyl silyl groups when there is employed those compounds containing ethyldimethylsilyl groups, such as chloroethyldimethylsilane; and likewise other corresponding groups derived from the other specific organosilicon compounds are found appended to silicon atoms of the resulting product when employing those other specific organosilicon compounds; and except that the d-spacing of the resulting products varies somewhat depending on the particular appended organosiloxy groups.

EXAMPLE 19

When Examples 1 and 2 are repeated except in place of the liquid reaction media thereof, i.e., isopropanol in the initial contacting of the chrysotile and pyridine in the second contacting, or the contacting of the product resulting from the first contacting, there are used other solvent mediums, and in particular any of 1-propanol, 2-butanol, and ethylene glycol for the isopropanol, and any of the following benzene-piperidine, cyclohexane-piperidine and toluene-piperidine 1:1 mixtures for the pyridine, there is in each instance provided a resulting product which appears to be identical to or to be the substantial equivalent of the Examples 1 and 2 products.

EXAMPLE 20

When Example 13 is repeated except in place of the liquid reaction media thereof, i.e., isopropanol in the initial contacting of the chrysotile and pyridine in the contacting of the product resulting from the first contacting, there are used methyl ethyl ketone for the isopropanol, and quinoline for the pyridine, there is in each instance provided a resulting product which appears to be identical to or to be the substantial equivalent of the Example 13 products.

EXAMPLE 21

Five hundred grams of chrysotile are dispersed in 32 liters of ethylene glycol by means of a Waring Blendor. There are added and mixed therewith 3.6 liters of water, 2.5 liters of chlorotrimethylsilane, and 2.3 liters of aqueous concentrated hydrochloric acid and the resultant mixture heated to reflux with mixing. Mixing is rather difficult and inefficient until the dispersed mixture separates as partially reacted chrysotile rises to the top of the glycol solution, usually after one hour of reflux. After five days at reflux at which the temperature did not exceed 90° C., the reaction mixture is cooled. The solvent is removed by centrifugation, and the product washed with acetone and methanol in the centrifuge. The product, a granular white powder, is dispersed in methanol in the blender, again centrifuged, and dried under an aspirator vacuum. Dried weight of the organo-inorgano polymer is 285 grams and it analyzes: C, 14.81±0.35%; H, 3.87±0.20%; $SiO_2$; 83.4%; and MgO, 0.01%. The product has the following characteristic properties:

Color—White by incident light.

Texture—Soft, non-abrasive powder or fibrous mat; "waxy" by feel or in grinding.

Chemical composition—Essentially carbon, hydrogen, silicon, and oxygen, traces of magnesium and iron.

Thermal behavior—Decomposes above 350°–400° C. to silica, controlled pyrolysis in air yields fibrous silica, presumably melts to fused silica at high temperature, stable below 350° C. in inert atmosphere, loss upon ignition at 1000° C. for one hour of 17.6 percent by weight.

Particle size—Fiber diameters 300–500 A., fiber length varies from less than 1 micron to more than 30 microns.

Surface area—By BET gas absorption is 300–350 m.$^2$/g.; pore size distribution includes a large number of 30–40 A. diameter size and another group of 100–300 A. diameter as well as "elastic" micropores in the 10–20 A. diameter size.

Structure—Organosilicate sheet polymer naturally curled to form scroll-like fibers; estimated single sheet thickness of 15–20 A.

Infrared absorption—Bond frequencies indicative of aliphatic C—H, Si—$CH_3$, O—H, and Si—O—Si bonds.

Bulk density—Dynamic gas pycnometry yields values of 2.0 to 2.4 grams/cm.$^3$ (varies depending on compaction).

Flotation density—Approximately 1.3 g./cc.

Refractive index—1.44, by immersion techniques, as well as by microscopy.

Solubility—Attacked by aqueous HF but not affected by common organic liquids, water, mineral acids, and weak alkali.

Colloidal—Efficiently thickens many organic liquids, including chlorinated aliphatics and aromatic hydrocarbons.

Wettability—Hydrophobic and not wet by polar solvents, such as polyols; oleophylic and is wet by organic oils, chlorinated solvents, etc.

Strength—The elementary fibers are flexible.

EXAMPLE 22

A stirred mixture of 2-propanol (25 ml.), chlorotrimethylsilane (15 ml.), and concentrated hydrochloric acid (5 ml.) is refluxed for about one day. The mixture is cooled, and there is added thereto synthetic chrysotile (0.5 g.). (The synthetic chrysotile employed was obtained through the courtesy of a U.S. corporation's research facilities. It had been synthesized by a hydrothermal process. It was a white free-flowing powder, showing a loss upon ignition at 980° C. of 14.0 percent by weight, of the following analysis: Si, 20.6%; Mg, 25.8%; Na, 0.6%; Ca, 0.22%; Fe, 0.06%; Al, 0.04%; Cu, 0.03%; Cr. 0.01%; Mn. <0.01%; Ni, <0.01%; Ti, 70.01%; and Zr, <0.01%. Its sodium content is attributed to the mineralizer employed in its preparation.) This mixture is refluxed for nine days and the product is recovered and washed with methanol with the aid of centrifugation. After drying at 110° C., the weight of product is 0.3 g. The product is a white, hydrophobic solid that swells only slightly in solvents which readily swell the organo-inorgano polymer derived from natural chrysotile. The product has a broad, weak X-ray diffraction maximum at about 15 A. and an infrared spectrum similar to that of the organo-inorgano polymer of Example 1. An electron microscope examination, 46,000× magnification, of the product reveals it to be fibers of relatively short length (most snythetic chrysotiles are of shorter length fibers than natural chrysotile) and of variable width between a diameter of 150 A. to about 900 A. The electron microscopic examination also provides evidence of the tubular nature of the fibrous product. A few fibers of cone shape and tube-within-a-tube shape also are observed with this not unexpected in that synthetic chrysotile fibers of such shapes have previously been reported.

The path followed in the formation of the polymer products, as observed in micrographs, is suggested in part by earlier reported streaming potential work on chrysotile. This work shows that the isoelectric pH of chrysotile is high, a value of 11.8 having been obtained, and leads to the conclusion in chrysotile that the external brucite layer thereof is completely stripped off the fiber when the pH is lowered to 2, leaving a silanol layer in its place.

This conclusion appears sound and suggests that the formation of the product derived from chrysotile is a multistage process, the first stage of which is the removal of the magnesium and hydroxyl ions from the surface of the chrysotile fibers and the substitution of silanol OH groups in their place. It then seems probable that substitution of this silanol layer takes place as a second step and that, when sufficient substitution has occurred, peeling of the layer takes place as a third step. Because peeling of the layer simultaneously exposes a fresh set of magnesium and hydroxyl ions, the three stages must take place at substantially the same time on a given tube. The fact that substantial substitution is achieved in the overall process suggests that the rate of the substitution process is reasonably well matched to the leaching and peeling processes, for, if these latter processes were too fast, comparatively poor substitution would be expected.

Since with chrysotile all the substitution must take place on the same side of the sheet, the question of the maximum attainable level of substitution arises. While this cannot be ascertained unequivocally by models or calculation because of the number of variables involved, models do suggest that the attainable level is considerably short of complete substitution—perhaps being about half of this. The experimental evidence obtained so far is in agreement with this conclusion, the usual level of substitution being around 50% (neglecting any differences in composition attributable to the fiber cores) and the maximum about 60% (in some room temperature reactions).

The relatively small OH absorption in the infrared spectra of the final products of each of the preceding examples indicates that relatively few of their sheet silicon atoms carry free silanol groups and that a large portion of such silanol groups as may have been present have been eliminated and replaced by cross-links of oxygen bridges to other sheet silicon atoms. All available evidence suggests that nearly all cross-linking occurs with a given sheet. The conditions under which the leaching and substitution occur and the unsymmetrical geometry of the sheet itself, also assure that all of this cross-linking is within a given sheet.

Many patterns of cross-linking appear possible, but for the chrysotile derived products those of the 1,5 and 1,7 types across the twelve-membered rings are believed to be most plausible because they would lead to the formation of 6- and 8-membered rings, both of which are fairly strain-free (8-membered rings, too, are among those favored in silicate chemistry).

The very pronounced reflections of the X-ray patterns corresponding to d-spacings of about 15 A. for the resulting products of the preceding examples can be attributed to the interlayer spacing. Evidence for this conclusion, in the case of the final resulting products of Examples 1 and 2, is found in the loss of this reflection in the swollen product and its reappearance in the redried product. The absence of strong reflections corresponding to other spacings in the final product of all examples can be ascribed, in part, to randomness in the substitution patterns.

Since the silicate sheet in chrysotile has pendant oxygen atoms on one side only, while that in apophyllite has pendant oxygen atoms on both sides, it is a reasonable assumption that products derived from chrysotile carry pendant siloxy groups on only one side of the sheet while those from apophyllite carry such pendant groups on both sides. The fibrous character of the products derived from chrysotile can be associated with curling of the sheets into tubes (caused by steric hindrance between the pendant siloxy groups). Photomicrographs of those products derived from chrysotile support this conclusion.

What is perhaps surprising in the chrysotile-derived products is the apparent ease with which the curling up, i.e., ordering, of the ribbons takes place upon solvent removal. While a few may be partially curled ribbons, as is apparent from photomicrographic evidence, most are apparently fully curled. Evidently very strong forces are at work here.

The aforedescribed method of synthesis of the organo-inorgano polymer points up its general inertness. A source of this inertness is, no doubt, partly kinetic since the fission of its backbone into even just two pieces requires the rupture of many bonds. However, also important must be the elemental composition of the final product—with as illustrated by Example 1, well over 65% of the total being silicon and oxygen.

The fact that the organo-inorgano polymer is obtainable as a fiber or sheet and intact as a unit of substantial dimensions, perhaps a tenth of a micron by several microns, judging from the electron micrographs, leads to the conclusion that its molecular weight is more than ten thousand and apparently many millions. That such an ordered product is obtained points out just how directed the polymerization process is in the formation of the $Si_2O_5^=$ sheet of chrysotile and the $Si_2O_5^=$ sheet of apophyllite. It also makes clear the difficulties needed to be overcome were one to try to make the organo-inorgano polymer by the usual polymerization processes used in organic polymer formation.

Further, the ordered nature of the product brings out the advantages of making the ordered organo-inorgano polymer, as has been described herein, from frameworks formed as an integral part of a crystallization process and hence formed in circumstances where the orienting forces are very high. Now, while chrysotile is particularly useful (because it occurs naturally in fairly high purity deposits, because it has a particularly accessible framework, and because it has a framework of an appropriate size), it is clear that the invention can be employed to advantage on other natural or synthetic crystals. Thus, although the invention has been illustrated with specificity as to employing chrysotile and apophyllite, it is to be understood that other sheet silicate minerals also may be employed in preparing ordered organo-inorgano polymers of the invention.

The ordered organo-inorgano polymers of the invention are useful in applications where polymers having a high degree of thermal stability and chemical inertness are required. They are useful as thermal insulators, as reinforcing agents for synthetic resins, such as silicone rubber, polyethylene, polypropylene, polyamides, polyesters, urea-formaldehyde polymers, phenolformaldehyde polymers, polyvinyl esters, and halides, etc. They are also useful per se and in combination with silicone oils and other oils as lubricants, and in combination with plasticizers they can be converted into shaped objects by molding and other methods known to those skilled in the art.

While the invention has been described and specifically illustrated with certain materials, at certain conditions, and in certain embodiments, it is to be understood that other modifications, embodiments, and variations will be apparent therefrom to those skilled in the art, and that all such obvious modifications, embodiments, and variations as fall within the true scope of the invention are intended to be encompassed within the appended claims.

What is claimed is:

1. A method for preparing a hydrophobic, ordered, organo-inorgano polymer of high molecular weight, which method includes the step of:
(I) contacting mass of an ordered sheet silicate mineral selected from the group consisting of chrysotile and apophyllite, which chrysotile is of elemental analysis showing the presence of silicon, oxygen, and magnesium, and which apophyllite is of elemental analysis showing the presence of silicon, oxygen, calcium, potassium, and fluorine,
(a) in an organic liquid reaction medium of an aliphatic alcohol or ketone in an amount up to 200 times by weight of the mass
(b) with an organosilicon compound in an amount providing at least one organosilicon group for each sheet silicon atom of said mineral, which organosilicon compound is selected from those of the formulae

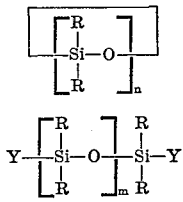

and

wherein $n$ is an integer of 3 to 6 inclusive, $m$ is an integer of from 1 to 6 inclusive, Y is the chlorine atom or R, and R is a methyl, ethyl, propyl, butyl, vinyl, or phenyl radical with more than 50 percent of the total R groups in each formula being methyl radicals with no more than 30 percent being phenyl radicals,
(c) in the presence of an aqueous strong acid, having an ionization constant larger than $1 \times 10^{-4}$, in an amount at least the stoichiometric amount for reaction with the magnesium content of chrysotile, when employing chrysotile, and the calcium and potassium content of apophyllite, when employing apophyllite,
(d) at a temperature between from 20° C. up to and including reflux temperature,
(e) for at least one hour and until substantial depletion from said mineral of magnesium, when employing chrysotile, and of calcium, potassium, and fluorine, when employing apophyllite, and until addition of a significant amount of pendant organosiloxy groups to sheet silicon atoms of said mineral.

2. The method of claim 1 which includes the additional step of:
(II) subsequently contacting a resulting organosilicon product of step (I) under more nearly neutral conditions with additional organosilicon compound, selected from those of the formulae presented in claim 1 and the following formulae

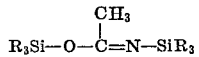

and

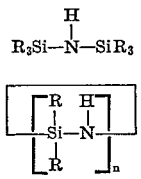

wherein $n$, $m$, Y, and R as aforedefined in claim 1, in an amount providing at least one organosilicon group for each sheet silicon atom of said mineral,
(a) with the subsequently contacting being with the additional organosilicon compound employed neat or in an organic liquid solvent for the additional organosilicon compound, which organic liquid solvent be a liquid paraffinic or aromatic hydrocarbon, or liquid aromatic tertiary amine, or a mixture thereof,
(b) at a temperature between from 20° C. up to and including reflux temperature, and
(c) for at least one hour and until addition of a substantial amount of pendant organosiloxy groups to sheet silicon atoms of said mineral.

3. The method of claim 2 in which: the mass is of the ordered sheet silicate mineral chrysotile; the organic liquid reaction medium for step (I) is a lower aliphatic alcohol in an amount between 20 to 100 times the weight of the mass; at least some contacting of the mass with the organosilicon compound is at reflux temperature and the contacting is for at least from one to seven days; step (II) includes an organic liquid reaction medium, which is a liquid aromatic tertiary amine in an amount between 5 to 100 times the weight of the resulting organosilicon product being contacted with additional organosilicon compound; and at least some contacting with the additional organosilicon compound is at reflux temperature and the contacting is for at least one day.

4. The method of claim 2 in which: the mass is of the ordered sheet silicate mineral apophyllite; the organic liquid reaction medium for step (I) is a lower aliphatic ketone in an amount between 20 to 100 times the weight of the mass; at least some contacting of the mass with the organosilicon compound is at reflux temperature and the contacting is for at least from one to seven days; step (II) includes an organic liquid reaction medium which is a liquid aromatic tertiary amine in an amount between 5 to 100 times the weight of the resulting organosilicon product being contacted with additional organosilicon compound; and at least some contacting with the additional organosilicon compound is at reflux temperature and the contacting is for at least one day.

5. A method of preparing a hydrophobic, ordered, organo-inorgano polymer consisting essentially of an ordered sheet silicate structure having trimethylsiloxy groups appended to sheet silicon atoms thereof, which method includes:
(I) contacting fibers of chrysotile with chlorotrimethylsilane in an amount between that providing at least one trimethylsilyl group for each sheet silicon atom of said chrysotile up to 100 times the weight of the fibers, while the fibers are in a liquid medium of a lower aliphatic alcohol or ketone in an amount of from 20 to 100 times the weight of the fibers and an aqueous strong acid of an ionization constant larger than $1 \times 10^{-4}$ in an amount of strong acid between that which is at least the stoichiometric amount for reaction with the magnesium content of the chrysotile up to an amount 10 times the weight of the fibers with water present in an amount of from one to three times by weight of the amount of strong acid, at a temperature between from 20° C. up to and including reflux temperature for at least one hour and until substantial depletion of magnesium ions from said fibers and addition of pendant trimethylsiloxy groups to at least 10 percent of the sheet silicon atoms of the chrysotile; and
(II) subsequently contacting a resulting organosilicon product from step (I) under nonacidic conditions with chlorotrimethylsilane in an amount between that providing at least one trimethylsilyl group for each sheet silicon atom of said product up to 100 times the weight of said product, while in a liquid aromatic tertiary amine in an amount between 5 to 100 times the weight of said product, at a temperature between from 20° C. up to and including reflux temperature for at least one hour and until addition of appended trimethylsiloxy groups to at least 15 percent of the sheet silicon atoms of said product.

6. A method of preparing a hydrophobic, ordered, organo-inorgano polymer consisting essentially of an ordered sheet silicate structure having trimethylsiloxy groups appended to sheet silicon atoms thereof, which method includes:

(I) contacting fragments of apophyllite with chlorotrimethylsilane in an amount between that providing at least one trimethylsilyl group for each sheet silicon atom of said apophyllite up to 100 times the weight of the fragments, while the fragments are in a liquid medium of a lower aliphatic alcohol or ketone in an amount of from 20 to 100 times the weight of the fragments and an aqueous strong acid of an ionization constant larger than $1 \times 10^{-4}$ in an amount of strong acid between that which is at least the stoichiometric amount for reaction with the calcium and potassium content of the apophyllite up to an amount 10 times the weight of the fragments with water present in an amount of from one to three times by weight of the strong acid, at a temperature between from 20° C. up to and including reflux temperature for at least one hour and until substantial depletion of calcium and potassium ions from said fragments and addition of pendant trimethylsiloxy groups to at least 10 percent of the sheet silicon atoms of the apophyllite; and (II) subsequently contacting a resulting organosilicon product resulting from step (I) under nonacidic conditions with N,O-bis(trimethylsilyl) acetamide in an amount between that providing at least one trimethylsilyl group for each sheet silicon atom of said product up to 100 times the weight of said product up to 100 times the weight of said product; while in a liquid aromatic tertiary amine in an amount between 5 to 100 times the weight of said product, at a temperature between from 20° C. up to and including reflux temperature for at least one hour and until addition of appended trimethylsiloxy groups to at least 15 percent of the sheet silicon atoms of said product.

7. A hydrophobic, ordered, organo-inorgano polymer derived from the ordered sheet silicate minerals chrysotile and apophyllite, which minerals are of an elemental analysis showing the presence of silicon, oxygen, and metal atoms, which polymer (a) has a molecular weight of more than ten thousand,
(b) by elemental chemical analysis thereof, consists essentially of carbon, hydrogen, silicon, and oxygen with at least 65 percent by weight thereof being silicon and oxygen,
(c) possesses an essential sheet silicate framework which consists essentially of silicon and oxygen and is alike the sheet silicate framework of the ordered silicate mineral from which it was derived with this essential silicate framework characterized by a substantial freedom from said metal atoms contained in said ordered silicate mineral, and by the presence of newly added oxygen-bridge cross-linkages between silicon atoms of its essential silicate framework, and
(d) has pendant alkylsiloxy groups attached to at least 10 percent of the sheet silicon atoms of its essential silicate framework with said pendant alkylsiloxy groups containing at least two methyl radical moieties per silicon atom thereof.

8. The polymer of claim 7 further characterized in that it exhibits an X-ray diffraction pattern having a strong reflection corresponding to d-spacing between 15 and 16 A.

9. The polymer of claim 7 which is derived from the ordered sheet silicate mineral of chrysotile and which has said pendant alkylsiloxy groups attached to at least 15 percent of the sheet silicon atoms of its essential silicate framework with trimethylsiloxy radicals accounting for more than 50 percent of the total of said pendant alkylsiloxy groups.

10. The polymer of claim 9 which has a molecular weight of more than one million and is in the structural form of a fiber.

11. The polymer of claim 10 which is in the structural form of the fiber formed from a rolled sheet.

12. The polymer of claim 7 which is derived from the ordered sheet silicate mineral of apophyllite, which has said pendant alkylsiloxy groups attached to at least 15 percent of the sheet silicon atoms of its essential silicate framework with trimethylsiloxy radicals accounting for more than 50 percent of the total of said pendant alkylsiloxy groups, and which is in the structural form of a sheet.

References Cited

Lentz, Inorganic Chemistry, vol. 3, No. 4, April 1964, pp. 574 to 579.

Frazier et al., Inorganic Chemistry, vol. 6, No. 9, September 1967, pp. 1693 to 1696.

Linsky et al., Journal of Polymer Science, Part A-2, vol. 9, pp. 143 to 160 (1971).

DONALD E. CZAJA, Primary Examiner

M. I. MARQUIS, Assistant Examiner

U.S. Cl. X.R.

23—182 R; 106—72, 188 R; 260—2 S, 37 SB, 824 R, 825, 826, 827

PO-1050
(5/69)

UNITED STATES PATENT OFFICE
CERTIFICATE OF CORRECTION

Patent No. 3,661,846          Dated May 9, 1972

Inventor(s)   Malcolm E. Kenney

It is certified that error appears in the above-identified patent and that said Letters Patent are hereby corrected as shown below:

Column 2, line 33, "$Si_2O=$" should read -- $Si_2O_5^=$ --.
Column 4, line 2, "contaciting" should read -- contacting --.
Column 7, about line 26 in the formula designated (B), that portion thereof reading

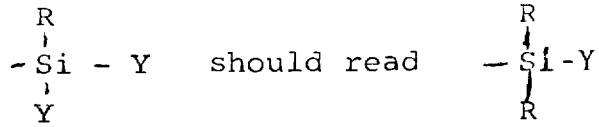

Column 10, line 19, "S." should read -- C --; line 60, insert a comma (,) after "oxygen".
Column 12, line 37, "-0.0" should read -- 10.0 --.
Column 13, line 24, "ethyldimethyl silyl" should read -- ethyldimethylsilyl --.
Column 14, line 3, the semicolon (;) after "$SiO_2$" should be a comma (,).
Column 17, line 3, insert -- a -- after "contacting".
Column 19, line 37, delete "up to 100 times the weight of said product".

Signed and sealed this 28th day of November 1972.

(SEAL)
Attest:

EDWARD M. FLETCHER, JR.
Attesting Officer

ROBERT GOTTSCHALK
Commissioner of Patents